United States Patent
Kamath Koteshwara et al.

(10) Patent No.: US 10,127,918 B1
(45) Date of Patent: Nov. 13, 2018

(54) METHODS FOR RECONSTRUCTING AN AUDIO SIGNAL

(71) Applicant: Amazon Technologies, Inc., Seattle, WA (US)

(72) Inventors: Krishna Kamath Koteshwara, Santa Clara, CA (US); Trausti Thor Kristjansson, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/585,458

(22) Filed: May 3, 2017

(51) Int. Cl.
| | |
|---|---|
| *G10L 21/02* | (2013.01) |
| *G10L 19/005* | (2013.01) |
| *G10L 15/22* | (2006.01) |
| *G10L 25/30* | (2013.01) |
| *G10L 15/06* | (2013.01) |
| *G11B 27/038* | (2006.01) |
| *G10L 21/0364* | (2013.01) |
| *G10L 21/0332* | (2013.01) |

(52) U.S. Cl.
CPC ........ *G10L 21/0205* (2013.01); *G10L 15/063* (2013.01); *G10L 15/22* (2013.01); *G10L 19/005* (2013.01); *G10L 21/0332* (2013.01); *G10L 21/0364* (2013.01); *G10L 25/30* (2013.01); *G11B 27/038* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 5,394,508 | A | * 2/1995 | Lim | ............... G10L 19/0212 704/200.1 |
| 2002/0007273 | A1 | * 1/2002 | Chen | ............... G10L 19/02 704/229 |
| 2004/0111256 | A1 | * 6/2004 | Tasaki | ............... G10L 19/00 704/219 |

OTHER PUBLICATIONS

Zhai et al.; A new non-uniform quantization method based on distribution of compressive sensing measurements and coefficients discarding; Asia-Pacific Signal and Information Processing Association Annual Summit and Conference (APSIPA); Nov. 1, 2013, pp. 4pp, 567.*

* cited by examiner

*Primary Examiner* — Abul Azad
(74) *Attorney, Agent, or Firm* — Pierce Atwood LLP

(57) ABSTRACT

A system configured to reconstruct audio signals. The system may identify missing audio samples due to packet loss or detect distortion caused by audio clipping and may reconstruct the audio data. The system may employ a forward-looking neural network that recursively predicts audio samples based on previous audio samples and/or a backward-looking neural network that recursively predicts audio samples based on subsequent audio samples. The system may generate audio data using only the forward-looking neural network for low latency applications or may generate audio data using both neural networks for mid to high latency applications. To reduce distortion in output audio data, the system may generate the audio data by cross-fading between outputs of the neural networks and/or may cross-fade between the generated audio data and the input audio data.

23 Claims, 14 Drawing Sheets

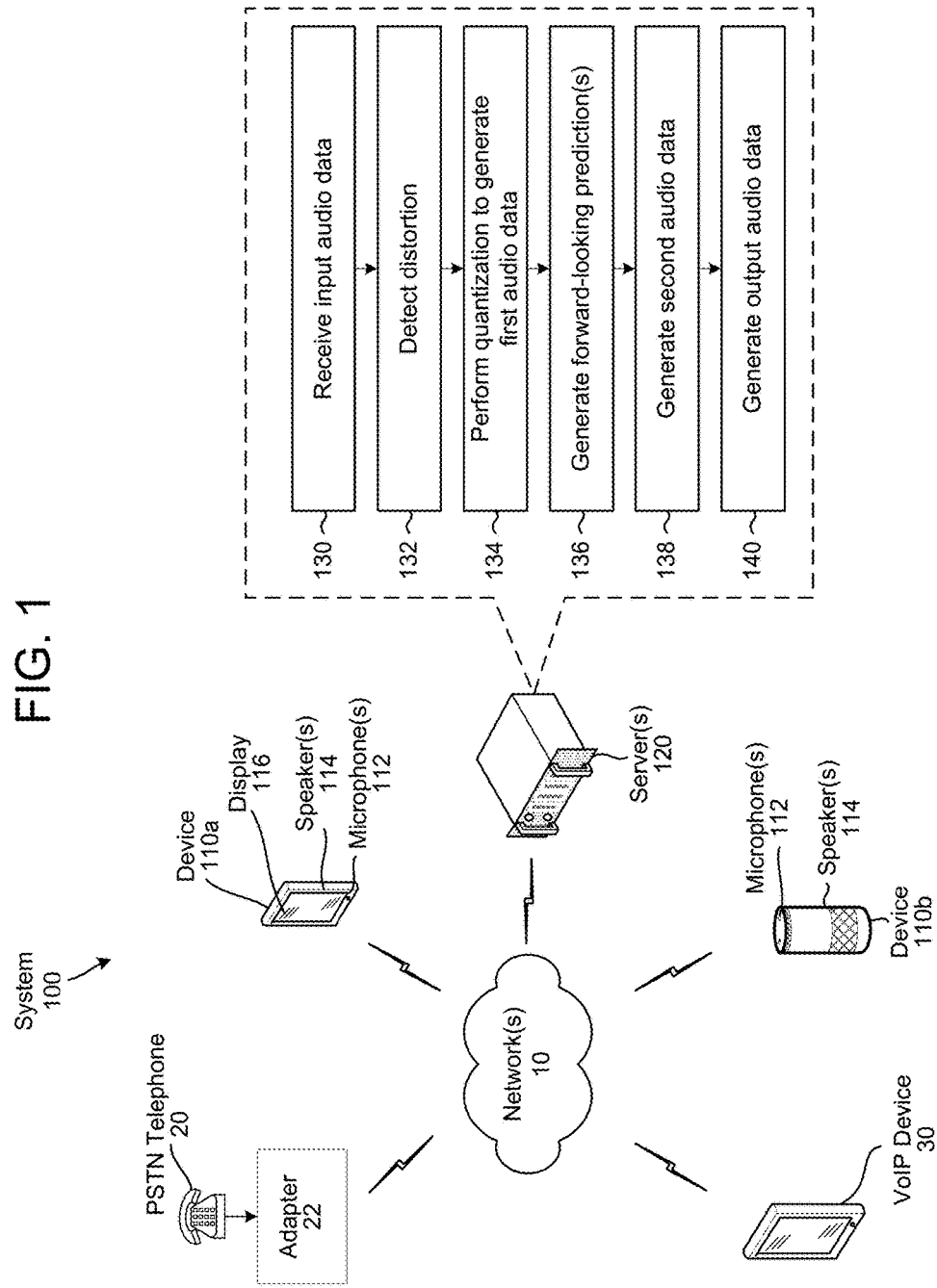

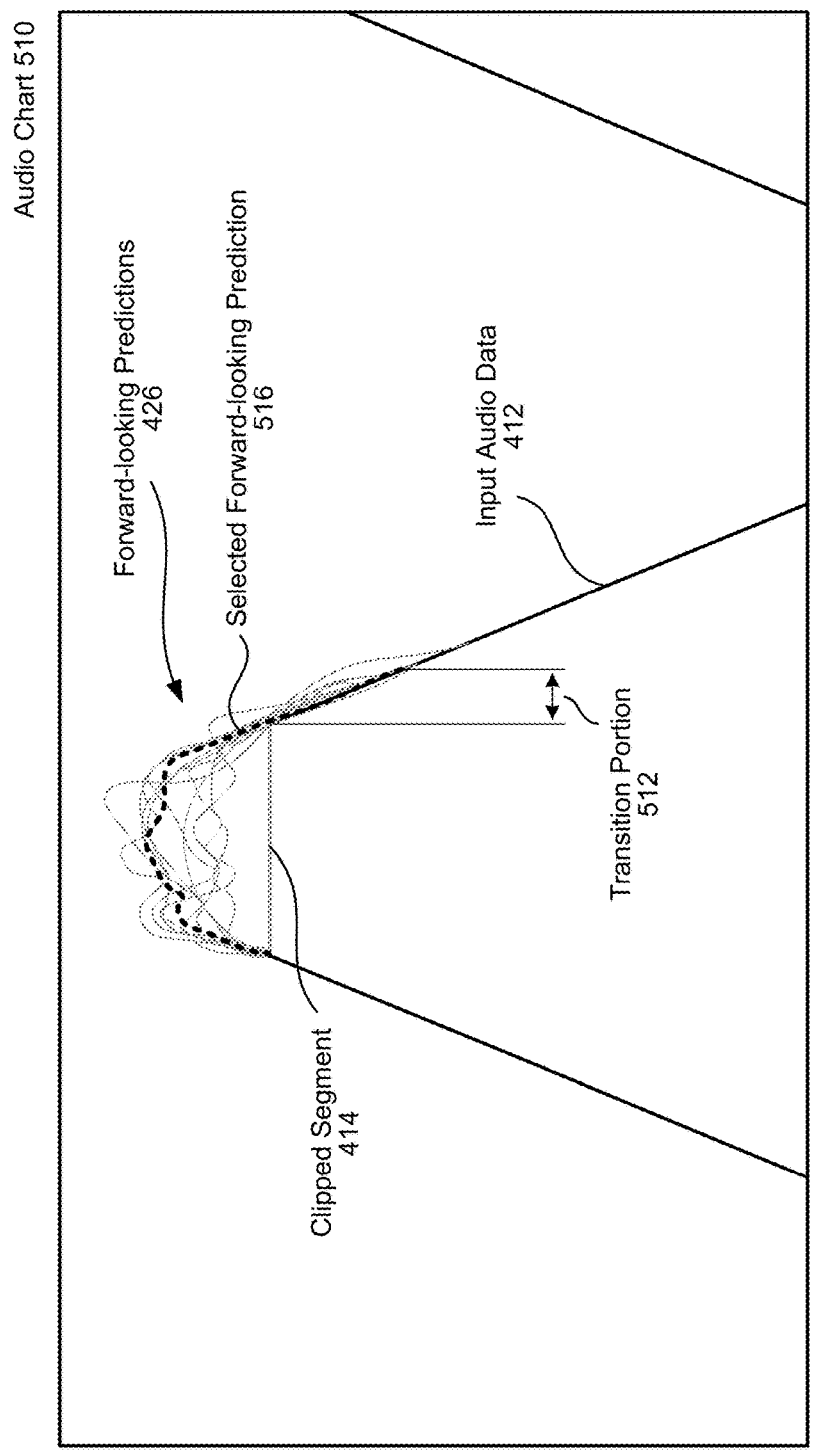

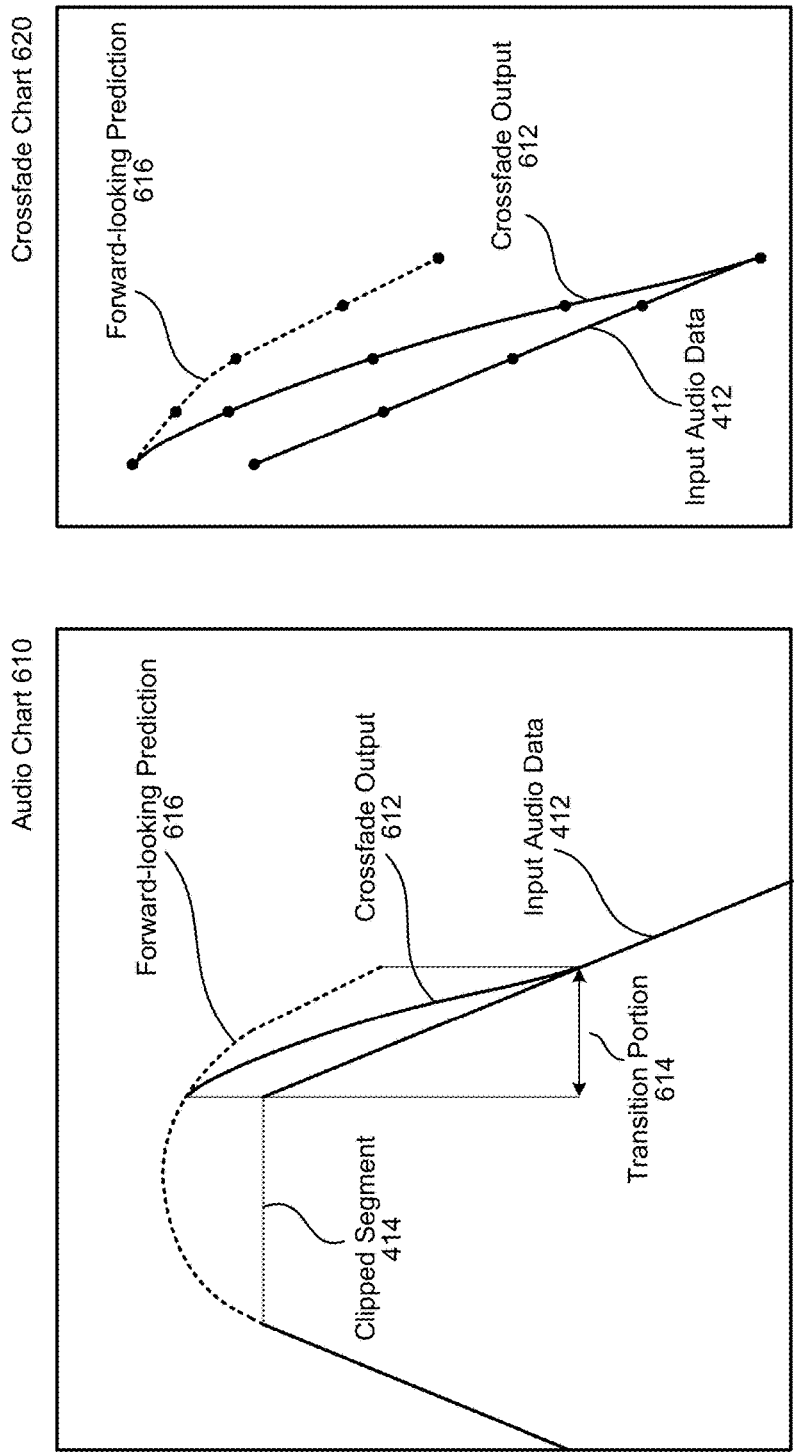

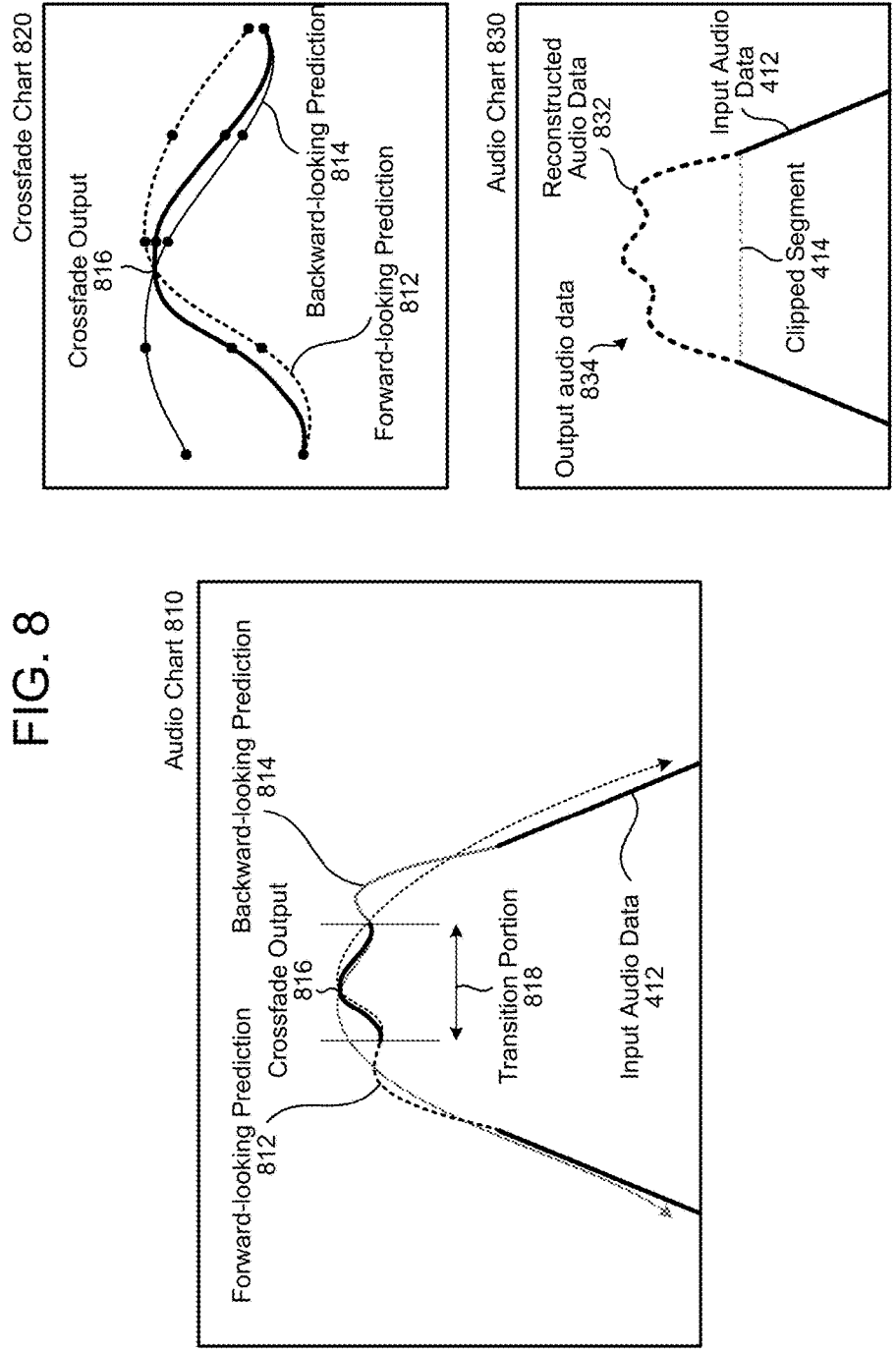

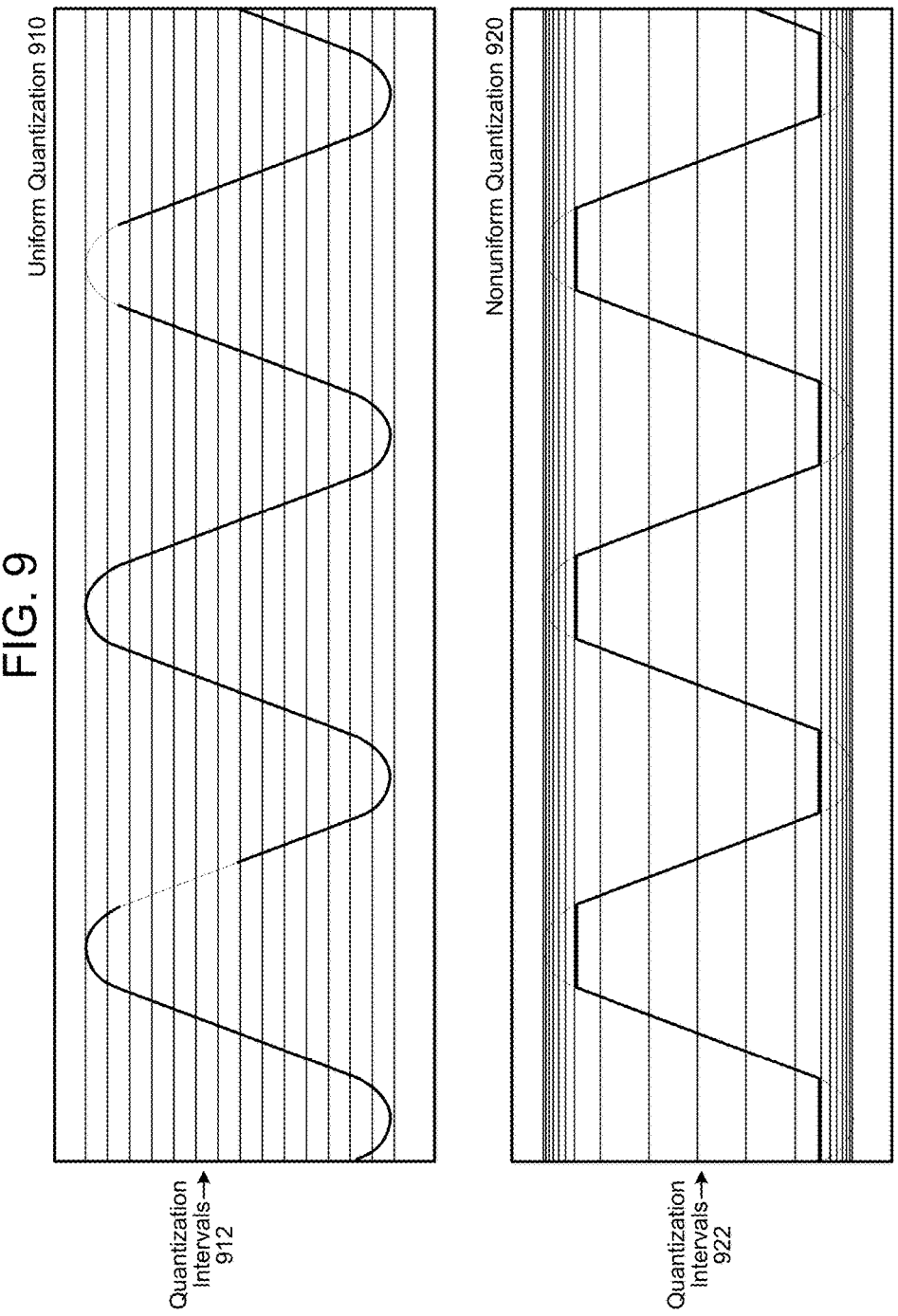

METHODS FOR RECONSTRUCTING AN AUDIO SIGNAL

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIG. 5 illustrates an example of selecting a best forward-looking prediction based on input audio data according to examples of the present disclosure.

FIG. 6 illustrates an example of cross-fading between a forward-looking prediction and input audio data according to examples of the present disclosure.

FIG. 8 illustrates an example of cross-fading between a forward-looking prediction and a backward-looking prediction according to examples of the present disclosure.

FIG. 9 illustrates an example of different quantization methods according to examples of the present disclosure.

DETAILED DESCRIPTION

Figure 2A:
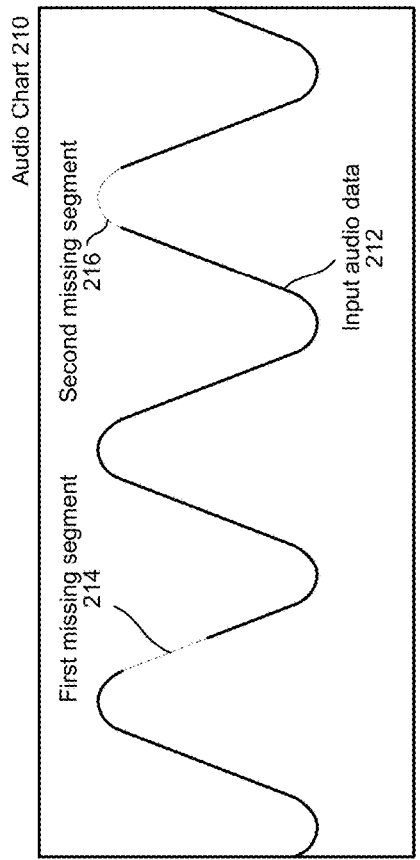
FIGS. 2A-2B illustrate examples of distortion caused by missing audio samples and clipped audio samples.

Electronic devices may be used to capture and process audio data that includes a plurality of audio samples. The audio data may be used for voice commands and/or may be output by speakers as part of a communication session. Distortion in the audio data may be caused by audio clipping (e.g., microphone reaches saturation) or missing audio samples (e.g., packets of data are lost in transit).

To reduce distortion in the audio data, devices, systems and methods are disclosed that perform signal reconstruction on the audio data. For example, the system may identify missing audio samples and/or clipped audio samples and may reconstruct the missing/distorted audio data using artificial neural networks. The system may employ a forward-looking neural network that recursively predicts audio samples based on previous audio samples and/or a backward-looking neural network that recursively predicts audio samples based on subsequent audio samples. The system may generate audio data using only the forward-looking neural network for low latency applications or may generate audio data using both neural networks for mid to high latency applications. To reduce distortion in output audio data, the system may generate the audio data by cross-fading between outputs of the neural networks and/or may cross-fade between the generated audio data and the input audio data.

FIG. 1 illustrates a high-level conceptual block diagram of a system 100 configured to perform signal reconstruction. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a Voice over Internet Protocol (VoIP) device 30, a public switched telephone network (PSTN) telephone 20 connected to an adapter 22, a first device 110a, a second device 110b and/or a server(s) 120, which may all be communicatively coupled to network(s) 10.

The VoIP device 30, the PSTN telephone 20, the first device 110a and/or the second device 110b may communicate with the server(s) 120 via the network(s) 10. For example, one or more of the VoIP device 30, the PSTN telephone 20, the first device 110a and the second device 110b may send audio data to the server(s) 120 via the network(s) 10, such as a voice message. While the server(s) 120 may receive audio data from multiple devices, for ease of explanation the disclosure illustrates the server(s) 120 receiving audio data from a single device at a time. The server(s) 120 may be configured to receive the audio data and perform signal reconstruction on the audio data, as will be discussed in greater detail below.

The audio data may include one or more audio samples, with a magnitude of an audio sample corresponding to a signal value at a specific point in time. For example, using a 44,100 Hz (e.g., 44.1 kHz) sampling frequency, a second of an audio signal may be represented by 44,100 audio samples, with each audio sample corresponding to a magnitude of the audio signal at a specific point in time (e.g., 1/44100 of a second or 22.7 ns). Thus, each audio sample corresponds to a specific time and a series of audio samples may correspond to a period of time. As used herein, one or more audio samples may be referred to as audio data and/or portions of the audio data may be referenced using individual audio samples. For example, the 44,100 audio samples may be referred to as first audio data, a series of 4,410 audio samples (e.g., 1/10 of a second) within the first audio data may be referred to as second audio data and/or a portion of the first audio data, or the like without departing from the disclosure. Additionally or alternatively, a specific audio sample may be individually referenced (e.g., a first audio sample) and/or the second audio data may be referred to as a plurality of audio samples (e.g., a first plurality of audio samples) without departing from the disclosure.

The VoIP device 30 may be an electronic device configured to connect to the network(s) 10 and to send and receive data via the network(s) 10, such as a smart phone, tablet or the like. Thus, the VoIP device 30 may send audio data to and/or receive audio data from the server(s) 120, either during a VoIP communication session or as a voice message. In contrast, the PSTN telephone 20 may be a landline telephone (e.g., wired telephone, wireless telephone or the like) connected to the PSTN (not illustrated), which is a landline telephone network that may be used to communicate over telephone wires, and the PSTN telephone 20 may not be configured to directly connect to the network(s) 10. Instead, the PSTN telephone 20 may be connected to the adapter 22, which may be configured to connect to the PSTN and to transmit and/or receive audio data using the PSTN and configured to connect to the network(s) 10 (using an Ethernet or wireless network adapter) and to transmit and/or receive data using the network(s) 10. Thus, the PSTN telephone 20 may use the adapter 22 to send audio data to and/or receive audio data from the second device 110b during either a VoIP communication session or as a voice message.

The first device 110a and the second device 110b may be electronic devices configured to send audio data to and/or receive audio data from the server(s) 120. The device(s) 110 may include microphone(s) 112, speakers 114, and/or a display 116. For example, FIG. 1 illustrates the second device 110b including the microphone(s) 112 and the speakers 114, while the first device 110a includes the microphone(s) 112, the speakers 114 and the display 116. While the second device 110b is illustrated as a speech-controlled device (e.g., second device 110b doesn't include a display 116), the disclosure is not limited thereto and the second device 110b may include the display 116 without departing from the disclosure. Using the microphone(s) 112, the device(s) 110 may capture audio data and send the audio data to the server(s) 120.

In some examples, the devices 110 may send the audio data to the server(s) 120 as part of a VoIP communication session. For example, the first device 110a may send first audio data to the server(s) 120 and the server(s) 120 may send the first audio data to the second device 110b.

In some examples, the devices 110 may send the audio data to the server(s) 120 in order for the server(s) 120 to determine a voice command. For example, the first device 110a may send first audio data to the server(s) 120, the server(s) 120 may determine a first voice command represented in the first audio data and may perform a first action corresponding to the first voice command (e.g., execute a first command, send an instruction to the first device 110a and/or other devices to execute the first command, etc.). Similarly, the second device 110b may send second audio data to the server(s) 120, the server(s) 120 may determine a second voice command represented in the second audio data and may perform a second action corresponding to the second voice command (e.g., execute a second command, send an instruction to the second device 110b and/or other devices to execute the second command, etc.).

In some examples, to determine the voice command the server(s) 120 may perform Automatic Speech Recognition (ASR) processing, Natural Language Understanding (NLU) processing and/or command processing to determine the voice command. The voice commands may control the device(s) 110, audio devices (e.g., play music over speakers, capture audio using microphones, or the like), multimedia devices (e.g., play videos using a display, such as a television, computer, tablet or the like), smart home devices (e.g., change temperature controls, turn on/off lights, lock/unlock doors, etc.) or the like.

While the above examples illustrate the server(s) 120 determining a voice command represented in the audio data, the disclosure is not limited thereto and the server(s) 120 may perform signal reconstruction on the audio data without determining a voice command. For example, the server(s) 120 may perform the signal reconstruction and a separate device may determine the voice command. Additionally or alternatively, the server(s) 120 may perform signal reconstruction on the audio data separate from any device determining a voice command without departing from the disclosure.

Figure 2B:
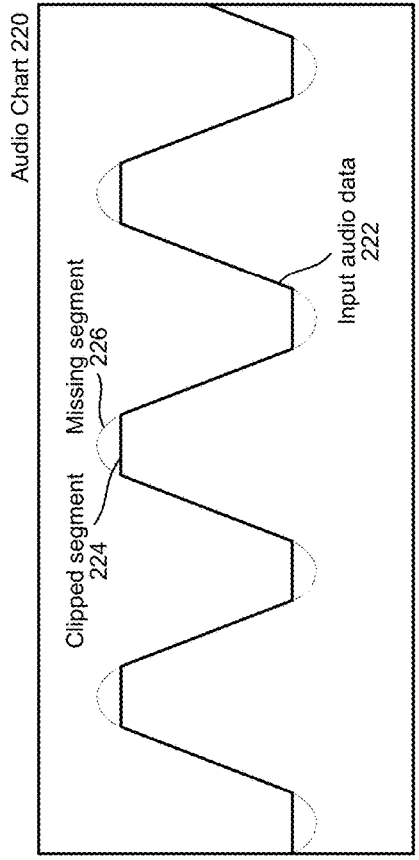

FIGS. 2A-2B illustrate examples of distortion caused by missing audio samples and clipped audio samples. FIG. 2A illustrates examples of missing audio samples, which may be caused by packet(s) of data being dropped while in route to the server(s) 120 over the network(s) 10. As the missing audio samples may result in distortion in audio output, the server(s) 120 may reconstruct the signal by generating predicted audio samples to replace the missing audio samples. As illustrated in FIG. 2A, audio chart 210 illustrates input audio data 212 that includes a first missing segment 214 and a second missing segment 216. The first missing segment 214 and the second missing segment 216 may be a similar length (e.g., equal to a number of audio samples included in a packet of data), although the disclosure is not limited thereto and a length of each missing segment may vary without departing from the disclosure. For example, the first missing segment 214 may correspond to a single packet of data being lost while the second missing segment 216 may correspond to two or more packets of data being lost. A duration of the audio output affected by the missing samples may depend on the number of audio samples included in a packet of data and the number of audio samples included in a packet of data may vary without departing from the disclosure. To illustrate an example, dropping a packet of data may correspond to roughly 20 ms of audio data to be reconstructed by the server(s) 120.

In contrast to dropping packets of data, FIG. 2B illustrates examples of audio clipping, which may be caused by an output from a microphone being saturated due to loud noises in an environment around the microphone. For example, audio data captured by the microphone might reach a saturation threshold due to high playback conditions (e.g., loud noises) and/or a high user utterance. As the audio clipping may result in distortion in audio output, the server(s) 120 may reconstruct the signal by attenuating input audio data and generating audio samples that model a sinusoidal curve. Thus, the reconstructed signal may correspond to the actual magnitude values input to the microphone if the input audio data hadn't reached the saturation threshold.

As illustrated in FIG. 2B, audio chart 220 illustrates input audio data 222 that includes a clipped segment 224 and a missing segment 226. The clipped segment 224 corresponds to a series of audio samples in the input audio data 222 having values equal to a saturation threshold associated with the microphone, which occurs when an output of the microphone is saturated due to a loud user utterance and/or a loud environment. The missing segment 226 corresponds to an ideal waveform that would have been captured by the microphone if the microphone were not saturated. In order to reconstruct the input audio data 222, the server(s) 120 may generate reconstructed audio data corresponding to the missing segment 226.

While FIG. 2B illustrates multiple clipped segments (e.g., clipped segment 224) having a fixed length, the disclosure is not limited thereto and the length of the clipped segments may vary without departing from the disclosure. For example, the number of audio samples included in the clipped segment 224 may vary based on environmental noise, a volume of the utterance or the like. To illustrate an example, the clipped segment 224 may correspond to roughly 1-2 ms of audio data to be reconstructed by the server(s) 120.

Figure 3:
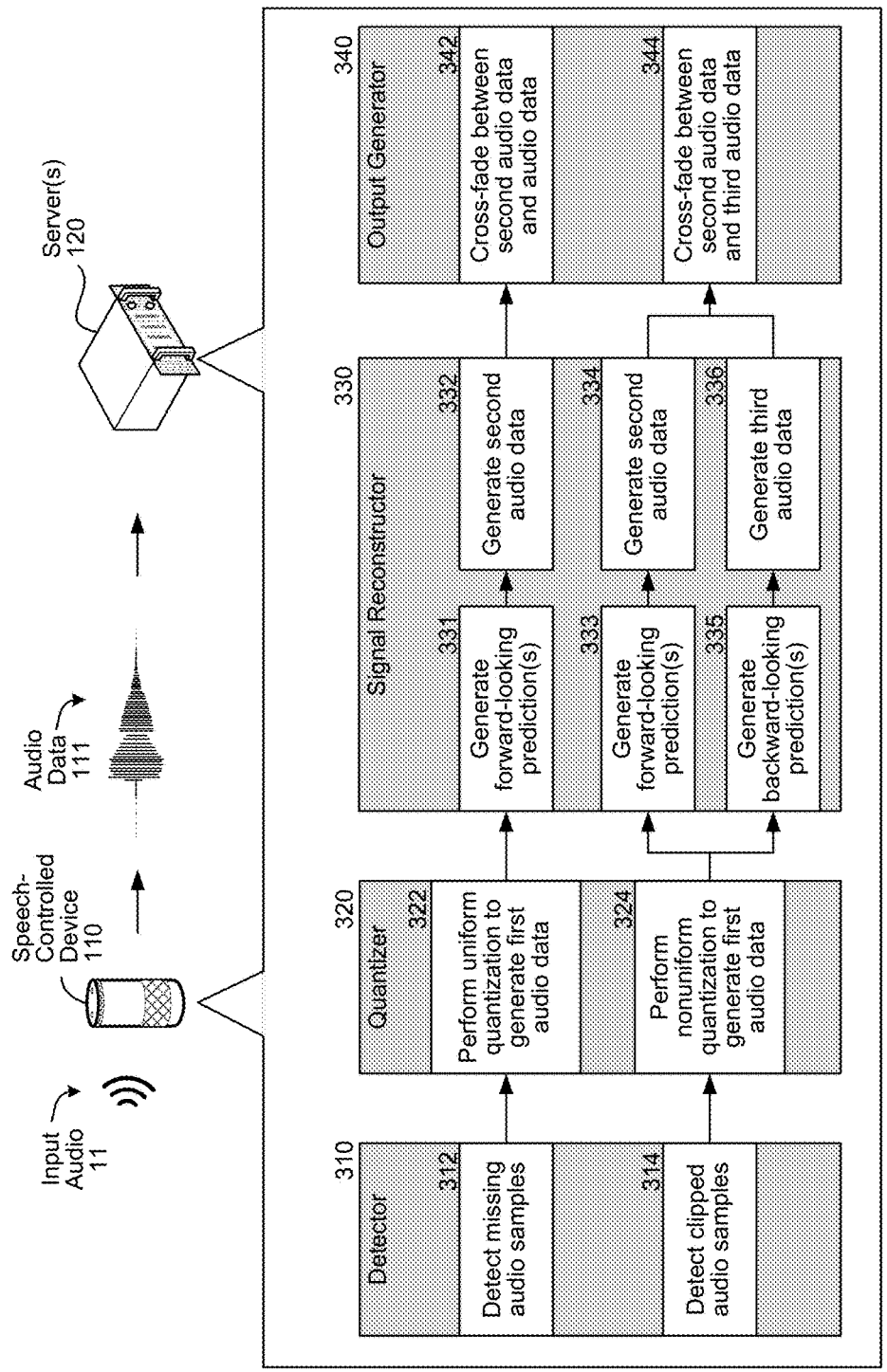
FIG. 3 is a conceptual diagram of how signal reconstruction is performed according to examples of the present disclosure.

FIG. 3 is a conceptual diagram of how signal reconstruction is performed according to examples of the present disclosure. As illustrated in FIG. 3, input audio 11 may be captured by a speech-controlled device 110 as audio data 111 and the audio data 111 may be sent to the server(s) 120. While FIG. 3 illustrates the speech-controlled device 110 capturing the input audio 11, the disclosure is not limited thereto and the server(s) 120 may receive the audio data 111 from any device without departing from the disclosure. As illustrated in FIG. 3, the device 110 and/or the server(s) 120 may perform signal reconstruction on the audio data. For ease of illustration, the following components and/or steps will be described with regard to the server(s) 120, although the disclosure is not limited thereto and the components may be included in the device 110 and/or the device 110 may perform the steps without departing from the disclosure.

As discussed above, the audio data 111 may exhibit audio clipping (e.g., series of audio samples having values at or near a saturation threshold) when the speech-controlled device 110 generates the audio data 111 and/or packets of data may be dropped when the audio data 111 is in transit to the server(s) 120 such that the server(s) 120 may receive the audio data 111 with missing audio samples. In order to perform signal reconstruction on the audio data 111, the server(s) 120 may process the audio data 111 using a detector 310, a quantizer 320, a signal reconstructor 330 and/or an output generator 340. The server(s) 120 may reconstruct the audio data 111 by replacing missing audio samples and/or clipped audio samples.

The detector 310 may identify portions of the audio data 111 that require reconstruction by detecting distortion included in the audio data 111. For example, the detector 310 may detect (312) missing audio samples caused by dropped packets of data and/or may detect (314) clipped audio samples (e.g., audio samples having a value equal to the saturation threshold). If the detector 310 detects the clipped audio samples, the server(s) 120 may optionally attenuate the audio data 111 prior to performing quantization.

The quantizer 320 may perform quantization to map values of the audio data 111 to discrete states (e.g., quantization intervals or "bins"), as discussed in greater detail below with regard to FIG. 9. The server(s) 120 may input the discrete states as features to a generative neural network in order to generate audio data. The quantizer 320 may use different quantization processes depending on whether the audio samples are missing or saturated. For example, when the audio samples are missing, the quantizer 320 may use a uniform quantization process that gives equal weight to each quantization interval (e.g., each quantization interval or bin is given a fixed resolution), as the server(s) 120 is attempting to reconstruct the entire segment. Thus, the quantizer 320 may perform (322) uniform quantization to generate first audio data from the audio data 111. The quantization process could correspond to standard encoding for audio samples (e.g., a-law algorithm/encoding, µaw algorithm/encoding, etc.), although the disclosure is not limited thereto.

In contrast, when the audio samples are clipped at a saturation threshold, the quantizer 320 may use a nonuniform quantization process that gives greater weight to quantization intervals associated with higher magnitudes (e.g., variable resolutions for the quantization intervals). In this example, the server(s) 120 is not attempting to reconstruct the entire segment and is only interested in reconstructing the clipped portions of the audio data 111 (e.g., highest amplitude values associated with peaks or lowest amplitude values associated with troughs). Thus, the quantizer 320 may give more weight to quantization intervals associated with the highest magnitudes and the lowest magnitudes, which corresponds to smaller quantization intervals (e.g., higher resolution, higher dynamic range, etc.) for local maxima/minima and larger quantization intervals (e.g., lower resolution, lower dynamic range, etc.) for the steep parts of the sine wave that aren't saturated. Thus, the quantizer 320 may perform (324) nonuniform quantization to generate first audio data from the audio data 111 (or the attenuated audio data). The quantization process could correspond to a combination of logarithmic and linear algorithms/encoding, although the disclosure is not limited thereto.

The signal reconstructor 330 may reconstruct the audio data 111 by generating reconstructed audio samples that replace the missing audio samples and/or the clipped audio samples. The signal reconstructor 330 may generate the reconstructed audio samples using one or more artificial neural network architectures ("neural networks"), which are generative models that provide a probability distribution of signal values given values of previous audio samples. The quantizer 320 may map the input audio data to discrete states, which may be input to the neural network(s) as features to generate the probability distribution of signal values. A forward-looking neural network uses previous audio samples (e.g., past audio samples) to predict subsequent audio samples in a forward direction (e.g., left to right), whereas a backward-looking neural network uses subsequent audio samples (e.g., future audio samples) to predict previous audio samples in a reverse direction (e.g., right to left). To generate a forward-looking audio data prediction (e.g., predicted values for a series of audio samples going left to right), a forward-looking neural network may recursively predict values for a series of audio samples, sample by sample, in the forward direction. To generate a backward-looking audio data prediction (e.g., predicted values for a series of audio samples going right to left), a backward-looking neural network may recursively predict values for a series of audio samples, sample by sample, in the reverse direction.

As the quantization processes and/or training data are different between reconstructing missing audio samples and clipped audio samples, a neural network trained to reconstruct missing audio samples will generate a different prediction than a neural network trained to reconstruct clipped audio samples. Thus, the signal reconstructor 330 may include a first neural network trained to generate forward-looking audio data predictions to reconstruct missing audio samples, a second neural network trained to generate forward-looking audio data predictions to reconstruct clipped audio samples, and a third neural network trained to generate backward-looking audio data predictions to reconstruct the clipped audio samples. The first neural network and the second neural network may include identical components, but due to the differences in quantization processes and training data, the first neural network may generate different predictions than the second neural network.

To reconstruct the missing audio samples, the signal reconstructor 330 may generate (331) one or more forward-looking audio data predictions based on the first audio data and may generate (332) second audio data based on the one or more forward-looking audio data predictions, as will be discussed in greater detail below with regard to FIGS. 4A-6. For example, the server(s) 120 may generate a single forward-looking audio data prediction by recursively predicting a series of audio samples, sample by sample, beginning with the first missing audio sample and proceeding in a forward direction (e.g., left to right). The server(s) 120 may repeat these steps to generate N forward-looking audio data predictions. While FIG. 3 illustrates the server(s) 120 generating N forward-looking audio data predictions in step 331, the server(s) 120 may also generate N backward-looking audio data predictions without departing from the disclosure.

FIG. 3 illustrates the signal reconstructor 330 only generating forward-looking audio data predictions when the audio samples are missing, as forward-looking audio data predictions are generated based on past audio samples and therefore have a lower latency than backward-looking audio data predictions. Thus, in applications where low latency is beneficial (e.g., VoIP or the like), using the forward-looking generative model will reduce a latency and avoid distortion or errors in the audio output. However, the disclosure is not limited thereto and the signal reconstructor 330 may generate one or more backward-looking audio data predictions when reconstructing missing audio samples without departing from the present disclosure. Similarly, while the following examples describe techniques for generating reconstructed audio samples to replace clipped audio samples, this is for illustrative purposes only and the disclosure is not limited thereto. Therefore, all of the techniques described with regard to reconstructing clipped audio samples may apply to reconstructing missing audio samples without departing from the disclosure.

To reconstruct the clipped audio samples, or to reconstruct the missing audio samples when latency is not an issue, the signal reconstructor 330 may generate (333) one or more forward-looking audio data predictions based on the first audio data and may generate (334) second audio data based on the one or more forward-looking audio data predictions. For example, the server(s) 120 may recursively predict a series of audio samples, sample by sample, beginning with the first clipped audio sample in the clipped segment and proceeding in a forward direction (e.g., left to right).

In addition, the signal reconstructor 330 may generate (335) one or more backward-looking audio data predictions based on the first audio data and may generate (336) third audio data based on the one or more backward-looking audio data predictions, as will be discussed in greater detail below with regard to FIGS. 7A-8. For example, the server(s) 120 may recursively predict a series of audio samples, sample by sample, beginning with the last clipped audio sample in the clipped segment and proceeding in a reverse direction (e.g., right to left).

The output generator 340 may generate output audio data based on the audio data 111 and the generated audio samples. As the forward-looking generative model generates the one or more forward-looking predictions based on past audio samples, the audio data 111 transitions smoothly to the second audio data at a beginning of a reconstructed audio segment. However, the second audio data is not based on future audio samples and may vary from the audio data 111 at an end of the reconstructed audio segment. Therefore, abruptly switching from the second audio data back to the audio data 111 may cause distortion in output audio. To reduce this distortion, the output generator 340 may cross-fade (342) between the second audio data and the audio data 111, as described in more detail below with regard to FIG. 6. In addition, the server(s) 120 may send the crossfaded output back to the neural network as feedback, instead of the actual prediction, to improve a response of the neural network.

As the backward-looking generative model generates the one or more backward-looking predictions based on future audio samples, the third audio data transitions smoothly to the audio data 111 at an end of the reconstructed audio segment. However, the second audio data may vary from the third audio data in the middle of the reconstructed audio segment and abruptly switching from the second audio data to the third audio data may cause distortion in output audio. To reduce this distortion, the output generator 340 may cross-fade (344) between the second audio data and the third audio data, as described in greater detail below with regard to FIG. 8.

While FIG. 3 illustrates the output generator 340 cross-fading to transition between the second audio data and the audio data 111 and/or between the second audio data and the third audio data, the disclosure is not limited thereto and the output generator 340 may reduce distortion by transitioning using any technique known to one of skill in the art without departing from the disclosure.

As illustrated in FIG. 1, the server(s) 120 may receive (130) input audio data and may detect (132) distortion included in the input audio data. For example, the server(s) 120 may receive the input audio data from the PSTN telephone 20, the VoIP device 30, the first device 110a and/or the second device 110b and may detect missing audio samples and/or saturated audio samples included in the input audio data, as discussed above with regard to the detector 310 illustrated in FIG. 3. The server(s) 120 may perform (134) quantization to generate first audio data, as discussed above with regard to the quantizer 320 illustrated in FIG. 3. The server(s) 120 may generate (136) one or more forward-looking audio data predictions and may generate (138) second audio data, as discussed above with regard to the signal reconstructor 330 illustrated in FIG. 3. For example, the server(s) 120 may generate a single forward-looking audio data prediction by recursively predicting a series of audio samples, sample by sample, beginning with the first missing/clipped audio sample and proceeding in a forward direction (e.g., left to right). The server(s) 120 may repeat these steps to generate N forward-looking audio data predictions. While not illustrated in FIG. 1, the server(s) 120 may also generate one or more backward-looking audio data predictions without departing from the disclosure, as discussed in greater detail below. Finally, the server(s) 120 may generate (140) output audio data by crossfading between the second audio data and the audio data 111, as discussed above with regard to the output generator 340 illustrated in FIG. 3.

While FIG. 1 illustrates the server(s) 120 performing steps 130-140 to perform signal reconstruction, the disclosure is not limited thereto. Instead, the device 110 may perform steps 130-140 to perform signal reconstruction without departing from the disclosure. For example, the device 110 may include the detector 310, the quantizer 320, the signal reconstructor 330 and/or the output generator 340 and may reconstruct audio signals that are missing audio samples (e.g., packets of data lost during VoIP communication sessions) and/or include clipped audio samples (e.g., microphone reaches saturation). Therefore, it is understood that any steps described with regard to the server(s) 120 may also be performed by the device 110 without departing from the disclosure.

Figure 4A:
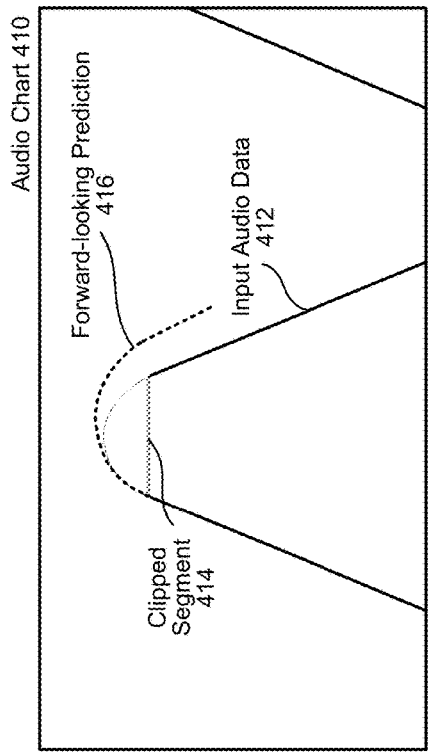
FIGS. 4A-4B illustrate examples of generating one or more forward-looking predictions according to examples of the present disclosure.
Figure 4B:
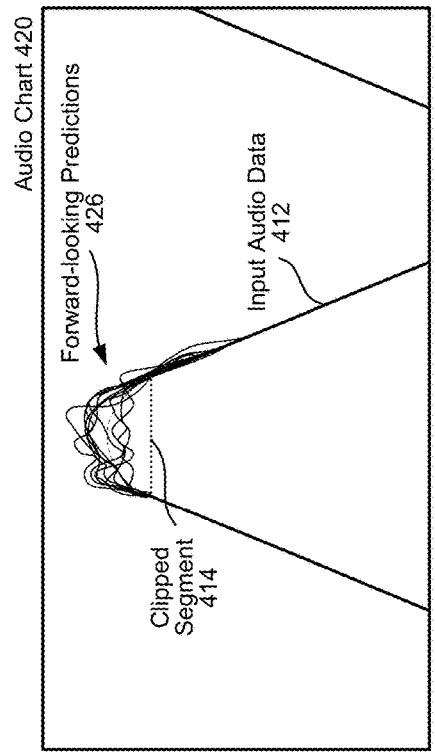

FIGS. 4A-4B illustrate examples of generating one or more forward-looking predictions according to examples of the present disclosure. As represented by audio chart 410 illustrated in FIG. 4A, the input audio data 412 may have a clipped segment 414 and the server(s) 120 may generate a single forward-looking audio data prediction 416 based on the audio samples prior to the clipped segment 414 (e.g., past audio samples). For example, the server(s) 120 may generate a single forward-looking audio data prediction by recursively predicting a series of audio samples, sample by sample, beginning with the first missing/clipped audio sample and proceeding in a forward direction (e.g., left to right). However, the disclosure is not limited thereto and the server(s) 120 may generate two or more forward-looking audio data predictions 426 without departing from the disclosure, as illustrated in the audio chart 420 illustrated in FIG. 4B.

In some examples, the server(s) 120 may generate two or more forward-looking audio data predictions 426 and select a single forward-looking audio data prediction from the two or more forward-looking audio data predictions 426. For example, the server(s) 120 may select a first forward-looking audio data prediction based on a best-fit analysis with the input audio data 412 (e.g., the first forward-looking audio data prediction is closest to the input audio data values after the clipped segment 414). However, the disclosure is not limited thereto and the server(s) 120 may select from the two or more forward-looking audio data predictions 426 using other techniques without departing from the disclosure. Additionally or alternatively, the server(s) 120 may determine a single forward-looking audio data prediction based on the two or more forward-looking audio data predictions 426. For example, the server(s) 120 may take an average of some or all of the two or more forward-looking audio data predictions 426 to generate the forward-looking audio data prediction used to reconstruct the clipped segment 414.

In some examples, the server(s) 120 may select, calculate or generate the forward-looking audio data prediction based on values of the input audio data 412 after the clipped segment 414, such that the forward-looking audio data prediction smoothly transitions to the input audio data 412 as illustrated in FIG. 5. However, the disclosure is not limited thereto and the server(s) 120 may cross-fade between the forward-looking audio data prediction (e.g., whether selected from or calculated from the two or more forward-looking audio data predictions 426) and the input audio data 412, as illustrated in FIG. 6, without departing from the disclosure.

FIG. 5 illustrates an example of selecting a best forward-looking prediction based on input audio data according to examples of the present disclosure. As represented by audio chart 510 illustrated in FIG. 5, the server(s) 120 may generate a plurality of forward-looking audio data predictions 526 and may determine that a selected forward-looking prediction 516 is the best fit for the input audio data 412. For example, the server(s) 120 may compare each of the forward-looking audio data predictions 426 to the transition portion 512 of the input audio data 412 to determine which of the forward-looking audio data predictions 426 is a closest fit to the input audio data 412. Thus, an optimal trajectory is found by repeating the forward pass 'N' times and picking the best prediction (e.g., the forward-looking audio data prediction that predicts audio samples in agreement with true samples of the input audio data 412 after the clipped segment 414).

In some examples, the server(s) 120 may generate output audio data by combining the selected forward-looking audio data prediction 516 with the input audio data 412 without cross-fading. For example, the selected forward-looking audio data prediction 516 may be chosen specifically to smoothly transition to the transition portion 512 of the input audio data 412. However, the disclosure is not limited thereto and in some examples the server(s) 120 may cross-fade between the selected forward-looking audio data prediction 516 and the input audio data 412, as illustrated in FIG. 6.

FIG. 6 illustrates an example of cross-fading between a forward-looking prediction and input audio data according to examples of the present disclosure. As represented by audio chart 610 illustrated in FIG. 6, the server(s) 120 may transition between a forward-looking audio data prediction 616 and the input audio data 412. The forward-looking audio data prediction 616 may correspond to the forward-looking audio data prediction 416, one of the two or more forward-looking audio data predictions 426, the selected forward-looking audio data prediction 516, and/or a forward-looking audio data prediction generated based on the two or more forward-looking audio data predictions 426 (e.g., using an average or the like).

The server(s) 120 may transition between the forward-looking audio data prediction 616 and the input audio data 412 by generating crossfade output 612 in a transition portion 614 of the input audio data 412. For example, the server(s) 120 may perform linear cross-fading over a duration of time to transition between the forward-looking audio data prediction 616 and the input audio data 412, although the disclosure is not limited thereto and the server(s) 120 may transition using other techniques known to one of skill in the art without departing from the disclosure. For example, the server(s) 120 may perform nonlinear cross-fading, may take a simple cross-fading equation and window it using any number of window shapes (e.g., triangular window, $\cos^2$ window, etc.) or the like without departing from the disclosure.

The server(s) 120 may generate a linear crossfading output $(t)=(t/T)\times(t)+(1-t/T)p(t)$, where $x(t)$ is the true signal, $p(t)$ is the predicted signal, T is the length of the cross-fade interval, and t is the time index from the beginning of the cross fade interval. Crossfade chart 620 illustrates an example of linearly cross-fading between the forward-looking audio data prediction 616 and the input audio data 412 using five data points. For example, a first data point of the crossfade output 612 corresponds to the forward-looking audio data prediction 616, a fifth data point of the crossfade output 612 corresponds to the input audio data 412, and the intermediate data points (e.g., second data point, third data point and fourth data point) correspond to a weighted average of the two. Thus, the second data point uses a 3:1 weighted average, the third data point uses a 1:1 weighted average, and the fourth data point uses a 1:3 weighted average.

Figure 7A:
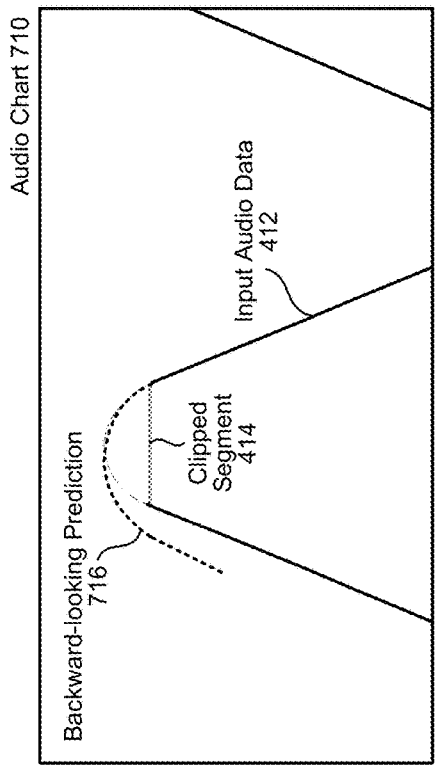
FIGS. 7A-7B illustrate examples of generating one or more backward-looking predictions according to examples of the present disclosure.
Figure 7B:
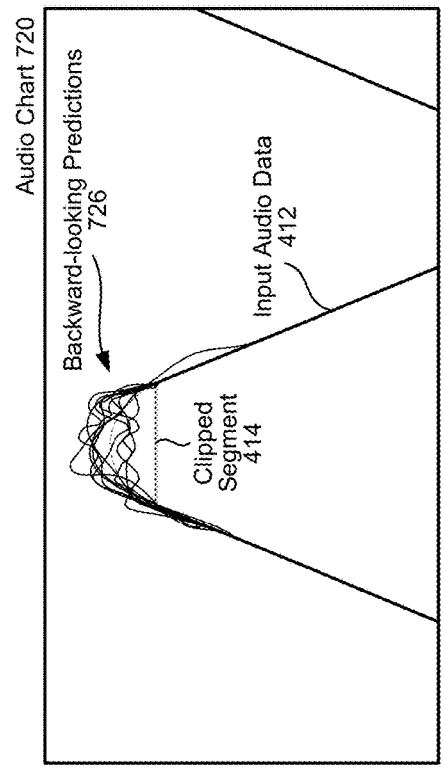

FIGS. 7A-7B illustrate examples of generating one or more backward-looking predictions according to examples of the present disclosure. As represented by audio chart 710 illustrated in FIG. 7A, the input audio data 412 may have a clipped segment 414 and the server(s) 120 may generate a single backward-looking audio data prediction 716 based on the audio samples subsequent to the clipped segment 414 (e.g., future audio samples). For example, the server(s) 120 may recursively predict a series of audio samples, sample by sample, beginning with the last clipped audio sample in the clipped segment and proceeding in a reverse direction (e.g., right to left). However, the disclosure is not limited thereto and the server(s) 120 may instead generate two or more backward-looking audio data predictions 726 without departing from the disclosure, as illustrated in audio chart 720 illustrated in FIG. 7B.

FIG. 8 illustrates an example of cross-fading between a forward-looking prediction and a backward-looking prediction according to examples of the present disclosure. As represented by audio chart 810 illustrated in FIG. 8, the server(s) 120 may transition between a forward-looking audio data prediction 812 and a backward-looking audio data prediction 814. The forward-looking audio data prediction 812 may correspond to the forward-looking audio data prediction 416, one of the two or more forward-looking audio data predictions 426, the selected forward-looking audio data prediction 516, and/or a forward-looking audio data prediction generated based on the two or more forward-looking audio data predictions 426 (e.g., using an average or the like) without departing from the disclosure. Similarly, the backward-looking audio data prediction 814 may correspond to the backward-looking audio data prediction 716, one of the two or more backward-looking audio data predictions 726, and/or a backward-looking audio data prediction generated based on the two or more backward-looking audio data predictions 726 (e.g., using an average or the like) without departing from the disclosure.

In some examples, the server(s) 120 may determine the forward-looking audio data prediction 812 and the backward-looking audio data prediction 814 independently. For example, the server(s) 120 may select one of the forward-looking audio data predictions 426 as the forward-looking audio data prediction 812 and/or generate the forward-looking audio data prediction 812 based on the forward-looking audio data predictions 426 (e.g., taking an average) without regard to the backward-looking audio data prediction 814. Similarly, the server(s) 120 may select one of the backward-looking audio data predictions 726 as the backward-looking audio data prediction 814 and/or generate the backward-looking audio data prediction 814 based on the backward-looking audio data predictions 726 (e.g., taking an average) without regard to the forward-looking audio data prediction 812.

The disclosure is not limited thereto, however, and the server(s) 120 may jointly determine the forward-looking audio data prediction 812 and the backward-looking audio data prediction 814 without departing from the disclosure. In some examples, the server(s) 120 may determine an ideal pairing between the forward-looking audio data predictions 426 and the backward-looking audio data predictions 726. For example, the server(s) 120 may determine a similarity metric between each of the forward-looking audio data predictions 426 and each of the backward-looking audio data predictions 726 and may select the forward-looking audio data prediction and the backward-looking audio data prediction associated with the highest similarity metric. To illustrate an example using ten forward-looking audio data predictions and ten backward-looking audio data predictions, the server(s) 120 may determine 100 pairwise combinations, determine 100 similarity metrics (e.g., mean squared error) corresponding to the 100 pairwise combinations, determine the best similarity metric (e.g., lowest mean squared error), and select corresponding audio data predictions as the forward-looking audio data prediction 812 and the backward-looking audio data prediction 814, Additionally or alternatively, the server(s) 120 may jointly determine the audio data predictions 812/814 to minimize a difference between the audio data predictions 812/814 during a transition from the forward-looking audio data prediction 812 to the backward-looking audio data prediction 814.

The server(s) 120 may transition between the forward-looking audio data prediction 812 and the backward-looking audio data prediction 814 by generating crossfade output 816 in a transition portion 818. For example, the server(s) 120 may perform linear cross-fading over a duration of time to transition between the forward-looking audio data prediction 812 and the backward-looking audio data prediction 814, although the disclosure is not limited thereto and the server(s) 120 may transition using other techniques known to one of skill in the art without departing from the disclosure. For example, the server(s) 120 may perform nonlinear cross-fading, may take a simple cross-fading equation and window it using any number of window shapes (e.g., triangular window, $\cos^2$ window, etc.) or the like without departing from the disclosure.

Crossfade chart 820 illustrates an example of linearly cross-fading between the forward-looking audio data prediction 812 and the backward-looking audio data prediction 814 using five data points. For example, a first data point of the crossfade output 816 corresponds to the forward-looking audio data prediction 812 (e.g., ratio of 1:0), a fifth data point of the crossfade output 816 corresponds to the backward-looking audio data prediction 814 (e.g., ratio of 0:1), and the intermediate data points (e.g., second data point, third data point and fourth data point) correspond to a weighted average of the two. Thus, the second data point uses a 3:1 weighted average, the third data point uses a 1:1 weighted average, and the fourth data point uses a 1:3 weighted average. While the crossfade chart 820 illustrates an example of linearly cross-fading using only five data points, the disclosure is not limited thereto and the number of data points may vary without departing from the disclosure.

The server(s) 120 may combine portions of the forward-looking audio data prediction 812, the backward-looking audio data prediction 814 and the crossfade output 816 to generate reconstructed audio data 832, as illustrated in audio chart 830. The reconstructed audio data 832 corresponds to the clipped segment 414 and transitions smoothly from the input audio data 412 prior to the clipped segment 414 and to the input audio data 412 after the clipped segment 414. The server(s) 120 may combine the reconstructed audio data 832 with portions of the input audio data 412 (e.g., excluding the clipped segment 414) to generate output audio data 834.

FIG. 9 illustrates an example of different quantization methods according to examples of the present disclosure. The server(s) 120 may perform quantization to map continuous values of the input audio data 412 to discrete states, which may be input as features to the generative neural network. The server(s) 120 may use different quantization processes depending on whether the audio samples are missing or saturated. For example, when the audio samples are missing, the server(s) 120 may use a uniform quantization 910 that gives equal weight to each quantization interval of the quantization intervals 912 (e.g., each quantization interval or bin is given a fixed resolution), as the server(s) 120 is attempting to reconstruct the entire segment. The quantization process could correspond to standard encoding for audio samples (e.g., a-law algorithm/encoding, μ-law algorithm/encoding), although the disclosure is not limited thereto.

In contrast, when the audio samples are clipped at a saturation threshold, the server(s) 120 may use a nonuniform quantization process that gives greater weight to quantization intervals associated with higher magnitudes (e.g., variable resolutions for the quantization intervals). In this example, the server(s) 120 is not attempting to reconstruct the entire segment and is only interested in reconstructing the clipped portions of the audio data 111 (e.g., highest amplitude values associated with peaks or lowest amplitude values associated with troughs). Thus, the server(s) 120 may give more weight to quantization intervals 922 associated with the highest magnitudes and the lowest magnitudes, which corresponds to smaller quantization intervals (e.g., higher resolution, higher dynamic range, etc.) for local maxima/minima and larger quantization intervals 922 (e.g., lower resolution, lower dynamic range, etc.) for the steep parts of the sine wave that aren't saturated. The quantization process could correspond to a combination of logarithmic and linear algorithms/encoding, although the disclosure is not limited thereto.

Figure 10A:
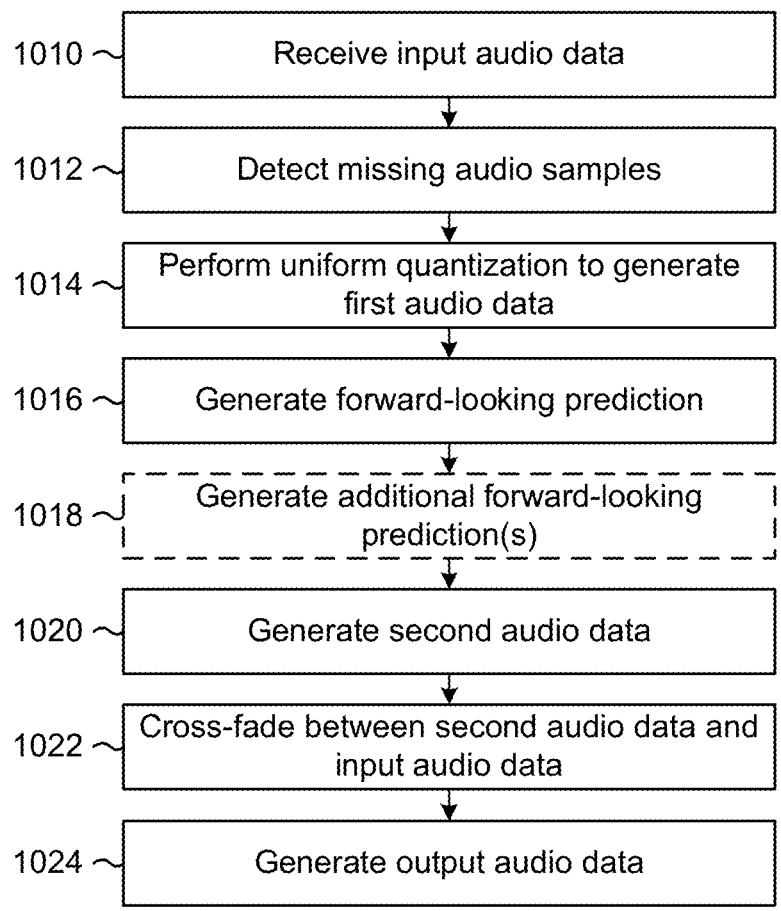
FIGS. 10A-10B are flowcharts conceptually illustrating example methods for reconstructing an audio signal using forward-looking prediction(s) according to examples of the present disclosure.
Figure 10B:
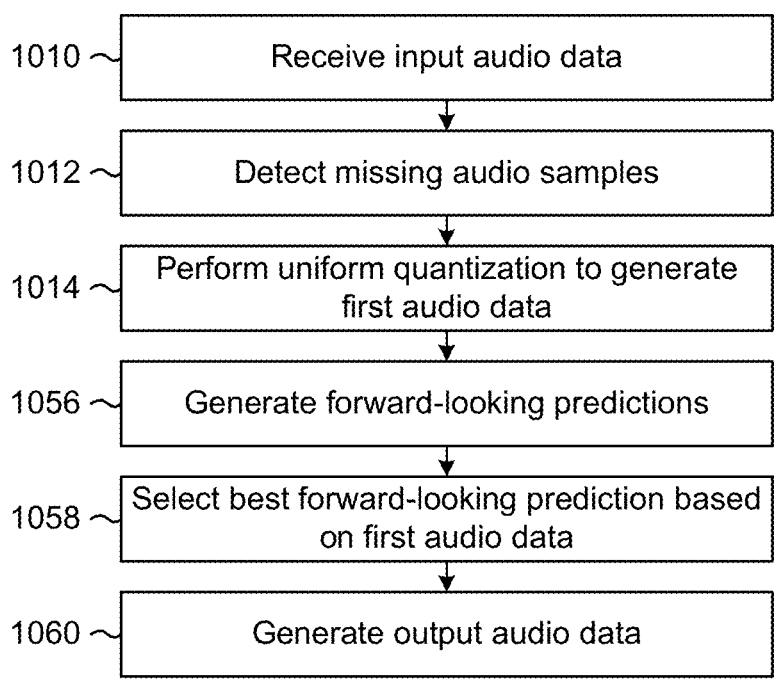

FIGS. 10A-10B are flowcharts conceptually illustrating example methods for reconstructing an audio signal using forward-looking prediction(s) according to examples of the present disclosure. As illustrated in FIG. 10A, the server(s) 120 may receive (1010) input audio data and may detect (1012) missing audio samples. For example, the server(s) 120 may identify gaps or abrupt changes in the audio data and determine that audio samples are missing.

The server(s) 120 may perform (1014) uniform quantization to generate first audio data from the input audio data. For example, uniform quantization uses a fixed quantization size such that each quantization interval is the same size and has the same resolution. The server(s) 120 may generate (1016) a forward-looking audio data prediction based on the first audio data. For example, the server(s) 120 may generate a single forward-looking audio data prediction by recursively predicting a series of audio samples, sample by sample, beginning with the first missing audio sample and proceeding in a forward direction (e.g., left to right). Optionally, the server(s) 120 may generate (1018) additional forward-looking audio data predictions based on the first audio data. For example, the server(s) 120 may generate N forward-looking audio data predictions.

The server(s) 120 may generate (1020) second audio data from the one or more forward-looking audio data predictions. For example, the server(s) 120 may select a single forward-looking audio data prediction and generate the second audio based on the selected prediction. Additionally or alternatively, the server(s) 120 may generate the second audio data based on two or more forward-looking audio data predictions. For example, the server(s) 120 may take an average of multiple predictions or the like.

After generating the second audio data, the server(s) 120 may cross-fade (1022) between the second audio data and the input audio data. For example, the server(s) 120 may perform a linear cross-fading from the second audio data to the input audio data over a fixed duration of time. Thus, a first audio sample included in the crossfade output is equal to the second audio data and a final audio sample included in the crossfade output is equal to the input audio data, with intermediate audio samples determined using a weighted average or the like.

The server(s) 120 may generate (1024) output audio data based on the cross-fade output and portions of the first audio data and the second audio data. For example, the server(s) 120 may combine a first portion of the first audio data, a portion of the second audio data, the crossfade output and a second portion of the first audio data to generate the output audio data. The output audio data effectively reconstructs the signal with reconstructed audio samples in place of the missing audio samples.

As illustrated in FIG. 10B, the server(s) 120 may receive (1010) input audio data and may detect (1012) missing audio samples. For example, the server(s) 120 may identify gaps or abrupt changes in the audio data and determine that audio samples are missing.

The server(s) 120 may perform (1014) uniform quantization to generate first audio data from the input audio data. For example, uniform quantization uses a fixed quantization size such that each quantization interval is the same size and has the same resolution. The server(s) 120 may generate (1056) multiple forward-looking audio data predictions based on the first audio data. For example, the server(s) 120 may generate a single forward-looking audio data prediction by recursively predicting a series of audio samples, sample by sample, beginning with the first missing audio sample and proceeding in a forward direction (e.g., left to right). The server(s) 120 may repeat these steps to generate N forward-looking audio data predictions. The server(s) 120 may select (1058) a best forward-looking audio data prediction of the multiple forward-looking audio data predictions based on the first audio data. For example, the server(s) 120 may select the prediction that is most similar to the first audio data after the missing audio segment.

The server(s) 120 may generate (1060) output audio data based on the input audio data and the best forward-looking audio data prediction. For example, the server(s) 120 may combine a first portion of the input audio data, the best forward-looking audio data prediction and a second portion of the input audio data to generate the output audio data. The output audio data effectively reconstructs the signal with reconstructed audio samples (e.g., the best forward-looking audio data predictions) in place of the missing audio samples.

Figure 11A:
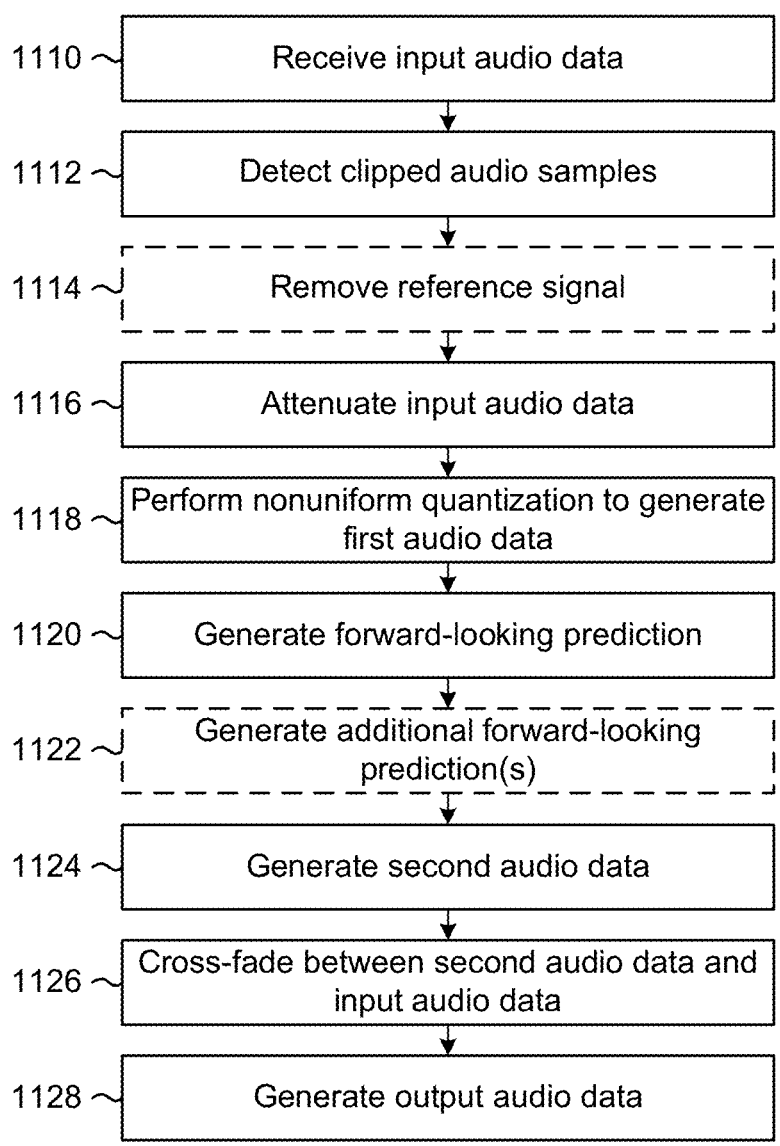
FIGS. 11A-11B are flowcharts conceptually illustrating example methods for reconstructing an audio signal using forward-looking prediction(s) and/or backward-looking prediction(s) according to examples of the present disclosure.
Figure 11B:
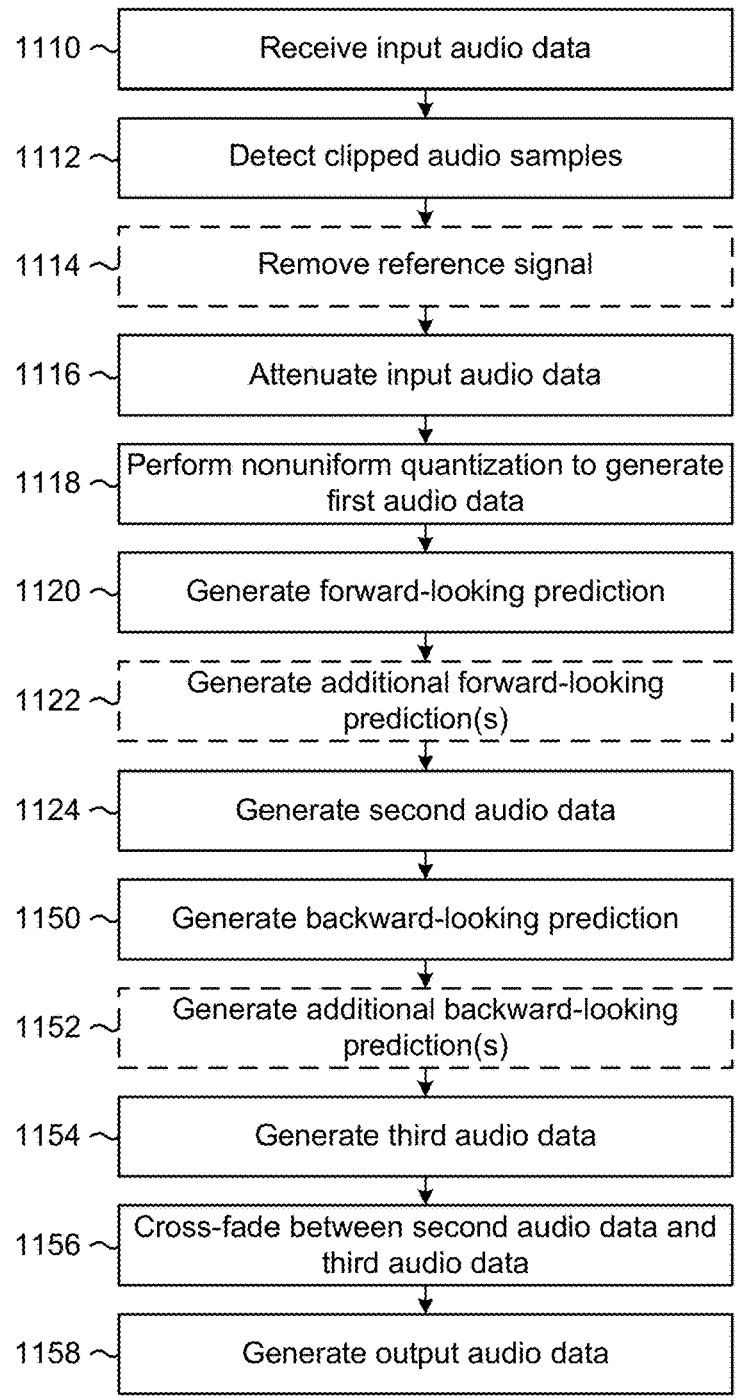

FIGS. 11A-11B are flowcharts conceptually illustrating example methods for reconstructing an audio signal using forward-looking prediction(s) and/or backward-looking prediction(s) according to examples of the present disclosure. As illustrated in FIG. 11, the server(s) 120 may receive (1110) input audio data and may detect (1112) clipped audio samples in the input audio data. For example, the server(s) 120 may determine that portions of the input audio data are saturated (e.g., values of consecutive audio samples included in the input audio data are equal to a maximum value in the input audio data) and may determine a saturation threshold value based on the maximum value. In some examples, the server(s) 120 may detect audio clipping and/or determine the saturation threshold based on an absolute magnitude and/or slope of the input audio data.

To illustrate an example, a slope of a sine wave varies over time, with local maxima (e.g., peaks) and local minima (e.g., troughs) corresponding to a slope of zero. As the sine wave increases from a first local minimum, the slope is positive and reaches a maximum positive value at a midpoint between the local first local minimum and a first local maximum. The slope then decreases as the sine wave approaches the first local maximum, reaching a value of zero at the first local maximum. The slope continues to decrease until it reaches a maximum negative value at a midpoint between the first local maximum and a second local minimum. The slope then increases until the second local minimum, at which point the slope is equal to zero. Thus, the slope is always changing as the absolute magnitude (e.g., value) of the sine wave changes. Similarly, values and slopes of normal audio samples vary over time. When audio clipping occurs, however, the absolute magnitude and/or slope may remain the same for multiple audio samples. For example, clipped audio samples may have an absolute magnitude equal to the saturation threshold and a slope of zero.

The server(s) 120 may optionally remove (1114) a reference signal from the input audio data to generate modified input audio data. For example, the input audio data may be captured by a microphone while audio is being output by speakers in proximity to the microphone. If the server(s) 120 know the reference signal used to generate the output audio, the server(s) 120 may perform acoustic echo cancellation (AEC) to remove the reference signal from the input audio data in order to isolate local speech (e.g., an utterance) as the modified input audio data. However, the disclosure is not limited thereto and in some examples, the server(s) 120 may not perform AEC to remove a reference signal from the input audio data. For example, during a VoIP communication session the input audio data is received from a remote device and AEC is not necessary.

As illustrated in FIG. 11, the server(s) 120 may detect whether audio clipping occurs prior to performing AEC. This is beneficial as clipped audio samples in the input audio data are detected based on an absolute magnitude (e.g., comparing to the saturation threshold) and/or slope (e.g., determining if slope is equal to zero). However, removing portions of the clipped audio samples that correspond to the reference signal changes the absolute magnitude and/or slope of the clipped audio samples in the modified input audio data. Therefore, the server(s) 120 may be unable to accurately detect audio clipping in the modified input audio data after the reference signal is removed.

If the server(s) 120 detect clipped audio samples in step 1112, the server(s) 120 may attenuate (1116) the input audio data/modified input audio data to generate attenuated audio data in order to make room for the reconstructed audio samples. For example, the server(s) 120 may attenuate the input audio data/modified input audio data by 6-12 dB to reduce a magnitude of the input audio data/modified input audio data.

As the distortion is caused by clipping at the saturation threshold, the assumption is that the rest of the input audio data/modified input audio data is normal and smooth, with only the clipped segments being not smooth (e.g., distorted). Therefore, the server(s) 120 may perform (1118) nonuniform quantization to generate first audio data from the input audio data. For example, nonuniform quantization uses a variable quantization size based on magnitude, such that quantization intervals associated with higher magnitudes are smaller and have higher resolution.

The server(s) 120 may generate (1120) a forward-looking audio data prediction based on the first audio data. For example, the server(s) 120 may recursively predict a series of audio samples, sample by sample, beginning with the first clipped audio sample in the clipped segment and proceeding in a forward direction (e.g., left to right). Optionally, the server(s) 120 may generate (1122) additional forward-looking audio data predictions based on the first audio data. For example, the server(s) 120 may generate N forward-looking audio data predictions.

The server(s) 120 may generate (1124) second audio data from the one or more forward-looking audio data predictions. For example, the server(s) 120 may select a single forward-looking audio data prediction and generate the second audio based on the selected prediction. Additionally or alternatively, the server(s) 120 may generate the second audio data based on two or more forward-looking audio data predictions. For example, the server(s) 120 may take an average of multiple predictions or the like.

After generating the second audio data, the server(s) 120 may cross-fade (1126) between the second audio data and the input audio data. For example, the server(s) 120 may perform a linear cross-fading from the second audio data to the input audio data over a fixed duration of time. Thus, a first audio sample included in the crossfade output is equal to the second audio data and a final audio sample included in the crossfade output is equal to the input audio data, with intermediate audio samples determined using a weighted average or the like.

The server(s) 120 may generate (1134) output audio data based on the cross-fade output and portions of the input audio data and the second audio data. For example, the server(s) 120 may combine a first portion of the input audio data, a portion of the second audio data, the crossfade output, and a second portion of the input audio data to generate the output audio data. The output audio data effectively reconstructs the signal with reconstructed audio samples in place of the clipped audio samples.

While FIG. 11A illustrates the server(s) 120 generating reconstructed audio samples in place of clipped audio samples using only forward-looking audio data predictions, the disclosure is not limited thereto. Instead, FIG. 11B illustrates an example method of generating reconstructed audio samples using both forward-looking audio data predictions and backward-looking audio data predictions. As illustrated in FIG. 11B, the server(s) 120 may perform steps 1110-1124 as discussed above with regard to FIG. 11A. The server(s) 120 may generate (1150) a backward-looking audio data prediction based on the first audio data. For example, the server(s) 120 may recursively predict a series of audio samples, sample by sample, beginning with the last clipped audio sample in the clipped segment and proceeding in a reverse direction (e.g., right to left). Optionally, the server(s) 120 may generate (1152) additional backward-looking audio data predictions based on the first audio data. For example, the server(s) 120 may generate N backward-looking audio data predictions.

The server(s) 120 may generate (1154) third audio data from the one or more backward-looking audio data predictions. For example, the server(s) 120 may select a single backward-looking audio data prediction and generate the third audio based on the selected prediction. Additionally or alternatively, the server(s) 120 may generate the third audio data based on two or more backward-looking audio data predictions. For example, the server(s) 120 may take an average of multiple predictions or the like.

After generating the second audio data and the third audio data, the server(s) 120 may cross-fade (1156) between the second audio data and the third audio data. For example, the server(s) 120 may perform a linear cross-fading from the second audio data to the third audio data over a fixed duration of time. Thus, a first audio sample included in the crossfade output is equal to the second audio data and a final audio sample included in the crossfade output is equal to the third audio data, with intermediate audio samples determined using a weighted average or the like.

The server(s) 120 may generate (1158) output audio data based on the cross-fade output and portions of the input audio data, the second audio data and the third audio data. For example, the server(s) 120 may combine a first portion of the input audio data, a portion of the second audio data, the crossfade output, a portion of the third audio data and a second portion of the input audio data to generate the output audio data. The output audio data effectively reconstructs the signal with reconstructed audio samples in place of the clipped audio samples.

Figure 12:
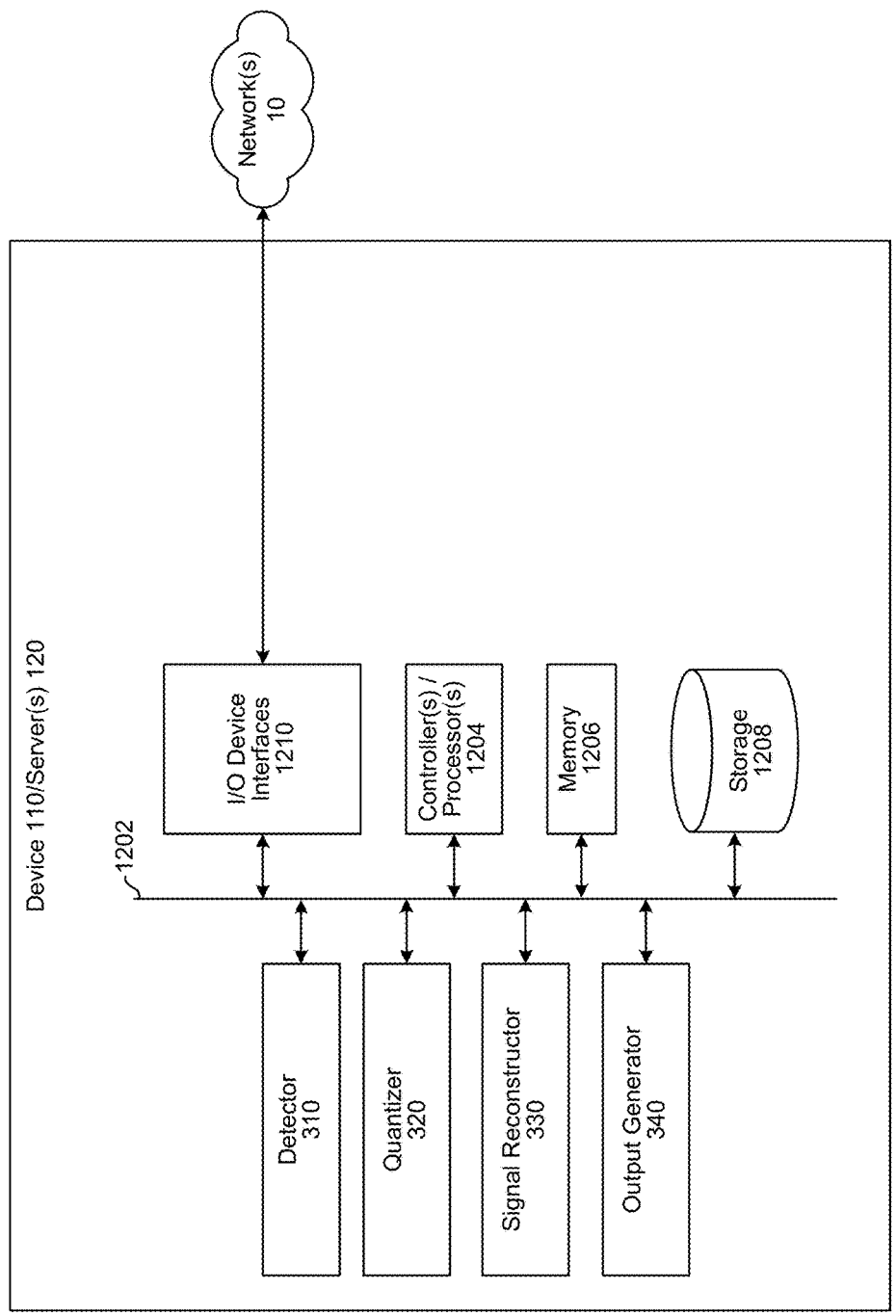
FIG. 12 is a block diagram conceptually illustrating example components of a system for signal reconstruction according to embodiments of the present disclosure.

FIG. 12 is a block diagram conceptually illustrating example components of a system for voice enhancement according to embodiments of the present disclosure. In operation, the system 100 may include computer-readable and computer-executable instructions that reside on the device 110 and/or the server(s) 120, as will be discussed further below.

As illustrated in FIG. 12, the device 110/server(s) 120 may include an address/data bus 1202 for conveying data among components of the device 110/server(s) 120. Each component within the device 110/server(s) 120 may also be directly connected to other components in addition to (or instead of) being connected to other components across the bus 1202.

The device 110/server(s) 120 may include one or more controllers/processors 1204, which may each include a central processing unit (CPU) for processing data and computer-readable instructions, and a memory 1206 for storing data and instructions. The memory 1206 may include volatile random access memory (RAM), non-volatile read only memory (ROM), non-volatile magnetoresistive (MRAM) and/or other types of memory. The device 110/server(s) 120 may also include a data storage component 1208, for storing data and controller/processor-executable instructions (e.g., instructions to perform the algorithm illustrated in FIGS. 1, 10A, 10B and/or 11). The data storage component 1208 may include one or more non-volatile storage types such as magnetic storage, optical storage, solid-state storage, etc. The device 110/server(s) 120 may also be connected to removable or external non-volatile memory and/or storage (such as a removable memory card, memory key drive, networked storage, etc.) through the input/output device interfaces 1210.

The device 110/server(s) 120 includes input/output device interfaces 1210. A variety of components may be connected through the input/output device interfaces 1210.

The input/output device interfaces 1210 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network(s) 10 through either wired or wireless connections.

The input/output device interfaces 1210 may also include an interface for an external peripheral device connection such as universal serial bus (USB), FireWire, Thunderbolt, Ethernet port or other connection protocol that may connect to network(s) 10. The input/output device interfaces 1210 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110/server(s) 120 may include a detector 310, a quantizer 320, a signal reconstructor 330 and/or an output generator 340, as discussed above with regard to FIG. 2. These components may comprise processor-executable instructions stored in storage 1208 to be executed by controller(s)/processor(s) 1204 (e.g., software, firmware, hardware, or some combination thereof). For example, components of the detector 310, the quantizer 320, the signal reconstructor 330 and/or the output generator 340 may be part of a software application running in the foreground and/or background on the device 110/server(s) 120. Some or all of the controllers/components of the detector 310, the quantizer 320, the signal reconstructor 330 and/or the output generator 340 may be executable instructions that may be embedded in hardware or firmware in addition to, or instead of, software. In one embodiment, the device 110/server(s) 120 may operate using an Android operating system (such as Android 4.3 Jelly Bean, Android 4.4 KitKat or the like), an Amazon operating system (such as FireOS or the like), or any other suitable operating system.

Executable computer instructions for operating the device 110/server(s) 120 and its various components may be executed by the controller(s)/processor(s) 1204, using the memory 1206 as temporary "working" storage at runtime. The executable instructions may be stored in a non-transitory manner in non-volatile memory 1206, storage 1208, or an external device. Alternatively, some or all of the executable instructions may be embedded in hardware or firmware in addition to or instead of software.

The components of the device 110/server(s) 120, as illustrated in FIG. 12, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving input audio data comprising a plurality of audio samples;
   detecting distortion in a first portion of the input audio data associated with a first period of time, the distortion caused by at least one of the plurality of audio samples missing from the input audio data or a magnitude value of one or more of the plurality of audio samples being equal to a saturation threshold value;
   determining that a second portion of the input audio data following the first portion is not distorted, the second portion corresponding to a second period of time that begins at a first time;
   performing, based on a magnitude of signal values of the input audio data, a quantization process to generate first audio data by mapping the signal values of the input audio data to discrete states corresponding to respective quantization intervals;
   generating, based on the first audio data, two or more first audio data predictions corresponding to at least part of the first period of time, the two or more first audio data predictions determined using a first generative model that receives the first audio data as input features and predicts a magnitude of signal values for audio samples recursively in a first direction in time;
   determining a first audio sample in the first audio data corresponding to the first time;
   determining a magnitude value associated with the first audio sample;
   selecting, based on at least the magnitude value associated with the first audio sample, a first data prediction of the two or more first audio data predictions;
   generating, based on the first data prediction, second audio data corresponding to at least part of the first period of time;
   generating, based on at least the first audio data and the second audio data, output audio data, the output audio data including the second audio data followed by a third portion of the first audio data that includes the first audio sample; and
   doing at least one of (a) causing audio corresponding to the output audio data to be output by at least one speaker, or (b) causing a function corresponding to a voice command represented by the output audio data to be executed.

2. The computer-implemented method of claim 1, further comprising:
   determining the third portion of the first audio data, the third portion including the first audio sample and corresponding to the second period of time;
   selecting the first data prediction based on the third portion and the magnitude value associated with the first audio sample;
   generating the output audio data, the output audio data cross-fading from the second audio data to the third portion of the first audio data; and
   training, using the output audio data, a neural network included in the first generative model.

3. The computer-implemented method of claim 1, further comprising:
   generating, based on the first audio data, a second data prediction corresponding to at least part of the first period of time, the second data prediction determined using a second generative model that predicts a magnitude of signal values for audio samples recursively in a second direction in time opposite the first direction beginning at the first time; and
   generating, based on the first data prediction and the second data prediction, the second audio data, the second audio data cross-fading between the first data prediction and the second data prediction, the second audio data corresponding to the first period of time.

4. The computer-implemented method of claim 1, further comprising:
   performing, based on a magnitude of signal values for the input audio data, the quantization process to generate the first audio data, the quantization process having nonuniform quantization intervals, wherein a first quantization interval corresponds to a first range of signal values and a second quantization interval corresponds to a second range of signal values that is smaller than the first range.

5. A computer-implemented method, comprising:
   receiving input audio data comprising a plurality of audio samples;
   detecting distortion in a first portion of the input audio data associated with a first period of time;
   determining that a second portion of the input audio data following the first portion is not distorted, the second portion corresponding to a second period of time that begins at a first time;
   performing a quantization process on the input audio data to generate first audio data by mapping signal values of the input audio data to discrete states corresponding to respective quantization intervals;
   generating, based on the first audio data, two or more first audio data predictions corresponding to at least part of the first period of time, the two or more first audio data predictions determined using a first generative model that receives the first audio data as input features and predicts audio samples recursively in a first direction in time;

generating, based on the two or more first audio data predictions, second audio data corresponding to at least part of the first period of time;

generating, based on at least the first audio data and the second audio data, output audio data; and doing at least one of (a) causing audio corresponding to the output audio data to be output by at least one speaker, or (b) causing a function corresponding to a voice command represented by the output audio data to be executed.

6. The computer-implemented method of claim 5, further comprising:

determining a first audio sample in the first audio data, the first audio sample corresponding to the first time;

determining a magnitude value associated with the first audio sample;

generating the second audio data by selecting, based on at least the magnitude value associated with the first audio sample, a first data prediction of the two or more first audio data predictions, the second audio data corresponding to the first period of time; and generating the output audio data, the output audio data including the second audio data followed by a third portion of the first audio data that includes the first audio sample.

7. The computer-implemented method of claim 5, further comprising:

determining a third portion of the first audio data, the third portion corresponding to at least part of the second period of time;

generating the second audio data by selecting, based on the third portion of the first audio data, a first data prediction of the two or more first audio data predictions, the second audio data corresponding to the first period of time and at least part of the second period of time;

generating, based on at least part of the second audio data and the third portion of the first audio data, third audio data, the third audio data cross-fading from the second audio data to the third portion of the first audio data; and generating the output audio data, the output audio data including a part of the second audio data followed by the third audio data and part of the third portion of the first audio data.

8. The computer-implemented method of claim 5, further comprising:

determining a third portion of the first audio data, the third portion corresponding to at least part of the second period of time;

generating the second audio data by averaging signal values of audio samples included in the two or more first audio data predictions, the second audio data corresponding to the first period of time and at least part of the second period of time;

generating, based on at least part of the second audio data and the third portion of the first audio data, third audio data, the third audio data cross-fading from the second audio data to the third portion of the first audio data; and generating the output audio data, the output audio data including part of the second audio data followed by the third audio data and part of the third portion of the first audio data.

9. The computer-implemented method of claim 5, further comprising:

selecting a first data prediction of the two or more first audio data predictions;

generating, based on the first audio data, a second data prediction corresponding to at least part of the first period of time, the second data prediction determined using a second generative model that predicts audio samples recursively in a second direction in time opposite the first direction beginning at the first time; and generating, based on the first data prediction and the second data prediction, the second audio data, the second audio data cross-fading between the first data prediction and the second data prediction, the second audio data corresponding to the first period of time.

10. The computer-implemented method of claim 5, further comprising:

selecting a first data prediction of the two or more first audio data predictions;

generating, based on the first audio data, two or more second audio data predictions corresponding to at least part of the first period of time, the two or more second audio data predictions determined using a second generative model that predicts audio samples recursively in a second direction in time opposite the first direction beginning at the first time;

selecting a second data prediction of the two or more second audio data predictions; and generating, based on the first data prediction and the second data prediction, the second audio data, the second audio data cross-fading between the first data prediction and the second data prediction, the second audio data corresponding to the first period of time.

11. The computer-implemented method of claim 5, further comprising:

generating, based on the first audio data, two or more second audio data predictions corresponding to at least part of the first period of time, the two or more second audio data predictions determined using a second generative model that predicts audio samples recursively in a second direction in time opposite the first direction beginning at the first time;

determining a plurality of similarity metrics, wherein the determining the plurality of similarity metrics further comprises:

determining a first similarity metric between a first data prediction of the two or more first audio data predictions and a second data prediction of the two or more second audio data predictions, and determining a second similarity metric between the first data prediction of the two or more first audio data predictions and a third data prediction of the two or more second audio data predictions;

determining that the second similarity metric is a highest similarity metric of the plurality of similarity metrics; and generating the second audio data, the second audio data cross-fading between the first data prediction and the third data prediction, the second audio data corresponding to the first period of time.

12. The computer-implemented method of claim 5, further comprising:

performing, based on a magnitude of signal values for the input audio data, the quantization process to generate the first audio data, the quantization process having nonuniform quantization intervals, wherein a first quantization interval corresponds to a first range of signal values and a second quantization interval corresponds to a second range of signal values that is smaller than the first range.

13. The computer-implemented method of claim 5, wherein:
the distortion is caused by at least one of the plurality of audio samples missing from the input audio data or a magnitude value of one or more of the plurality of audio samples being equal to a saturation threshold value.

14. A system comprising:
at least one processor; and
memory including instructions operable to be executed by the at least one processor to perform a set of actions to configure the system device to:
receive input audio data comprising a plurality of audio samples;
detect distortion in a first portion of the input audio data associated with a first period of time;
determine that a second portion of the input audio data following the first portion is not distorted, the second portion corresponding to a second period of time that begins at a first time;
perform a quantization process on the input audio data to generate first audio data by mapping signal values of the input audio data to discrete states corresponding to respective quantization intervals;
generate, based on the first audio data, two or more first audio data predictions corresponding to at least part of the first period of time, the two or more first audio data predictions determined using a first generative model that receives the first audio data as input features and predicts audio samples recursively in a first direction in time;
generate, based on the two or more first audio data predictions, second audio data corresponding to at least part of the first period of time;
generate, based on at least the first audio data and the second audio data, output audio data; and
do at least one of (a) cause audio corresponding to the output audio data to be output by at least one speaker, or (b) cause a function corresponding to a voice command represented by the output audio data to be executed.

15. The system of claim 14, wherein the memory includes additional instructions operable to be executed by the at least one processor to further configure the system to:
determine a first audio sample in the first audio data, the first audio sample corresponding to the first time;
determine a magnitude value associated with the first audio sample;
generate the second audio data by selecting, based on at least the magnitude value associated with the first audio sample, a first data prediction of the two or more first audio data predictions, the second audio data corresponding to the first period of time; and
generate the output audio data, the output audio data including the second audio data followed by a third portion of the first audio data that includes the first audio sample.

16. The system of claim 14, wherein the memory includes additional instructions operable to be executed by the at least one processor to further configure the system to:
determine a third portion of the first audio data, the third portion corresponding to at least part of the second period of time;

generate the second audio data by selecting, based on the third portion of the first audio data, a first data prediction of the two or more first audio data predictions, the second audio data corresponding to the first period of time and at least part of the second period of time;
generate, based on at least part of the second audio data and the third portion of the first audio data, third audio data, the third audio data cross-fading from the second audio data to the third portion of the first audio data; and
generate the output audio data, the output audio data including a part of the second audio data followed by the third audio data and part of the third portion of the first audio data.

17. The system of claim 14, wherein the memory includes additional instructions operable to be executed by the at least one processor to further configure the system to:
determine a third portion of the first audio data, the third portion corresponding to at least part of the second period of time;
generate the second audio data by averaging signal values of audio samples included in the two or more first audio data predictions, the second audio data corresponding to the first period of time and at least part of the second period of time;
generate, based on at least part of the second audio data and the third portion of the first audio data, third audio data, the third audio data cross-fading from the second audio data to the third portion of the first audio data; and
generate the output audio data, the output audio data including part of the second audio data followed by the third audio data and part of the third portion of the first audio data.

18. The system of claim 14, wherein the memory includes additional instructions operable to be executed by the at least one processor to further configure the system to:
select a first data prediction of the two or more first audio data predictions;
generate, based on the first audio data, a second data prediction corresponding to at least part of the first period of time, the second data prediction determined using a second generative model that predicts audio samples recursively in a second direction in time opposite the first direction beginning at the first time; and
generate, based on the first data prediction and the second data prediction, the second audio data, the second audio data cross-fading between the first data prediction and the second data prediction, the second audio data corresponding to the first period of time.

19. The system of claim 14, wherein the memory includes additional instructions operable to be executed by the at least one processor to further configure the system to:
select a first data prediction of the two or more first audio data predictions;
generate, based on the first audio data, two or more second audio data predictions corresponding to at least part of the first period of time, the two or more second audio data predictions determined using a second generative model that predicts audio samples recursively in a second direction in time opposite the first direction beginning at the first time;
select a second audio prediction of the two or more second audio data predictions; and
generate, based on the first data prediction and the second data prediction, the second audio data, the second audio data cross-fading between the first data prediction and the second data prediction, the second audio data corresponding to the first period of time.

20. The system of claim 14, wherein the memory includes additional instructions operable to be executed by the at least one processor to further configure the system to:
   generate, based on the first audio data, two or more second audio data predictions corresponding to at least part of the first period of time, the two or more second audio data predictions determined using a second generative model that predicts audio samples recursively in a second direction in time opposite the first direction beginning at the first time;
   determine a plurality of similarity metrics, wherein determining the plurality of similarity metrics further comprises:
      determining a first similarity metric between a first data prediction of the two or more first audio data predictions and a second data prediction of the two or more second audio data predictions, and
      determining a second similarity metric between the first data prediction of the two or more first audio data predictions and a third data prediction of the two or more second audio data predictions;
   determine that the second similarity metric is a highest similarity metric of the plurality of similarity metrics; and
   generate the second audio data, the second audio data cross-fading between the first data prediction and the third data prediction, the second audio data corresponding to the first period of time.

21. The system of claim 14, wherein the memory includes additional instructions operable to be executed by the at least one processor to further configure the system to:
   perform, based on a magnitude of signal values for the input audio data, the quantization process to generate the first audio data, the quantization process having nonuniform quantization intervals, wherein a first quantization interval corresponds to a first range of signal values and a second quantization interval corresponds to a second range of signal values that is smaller than the first range.

22. The system of claim 14, wherein the input audio data corresponds to an utterance, and the memory includes additional instructions operable to be executed by the at least one processor to further configure the system to:
   cause a voice command represented by the utterance to be determined; and
   cause the function to be performed based at least in part on the voice command.

23. The system of claim 14, wherein the memory includes instructions operable to be executed by the at least one processor to configure the system to:
   cause the audio corresponding to the output audio data to be output by the at least one speaker.

* * * * *